Feb. 14, 1928.
W. S. DWYER
1,659,353
FLEXIBLE COUPLING FOR ROTARY MEMBERS
Filed Aug. 16, 1927     4 Sheets-Sheet 1
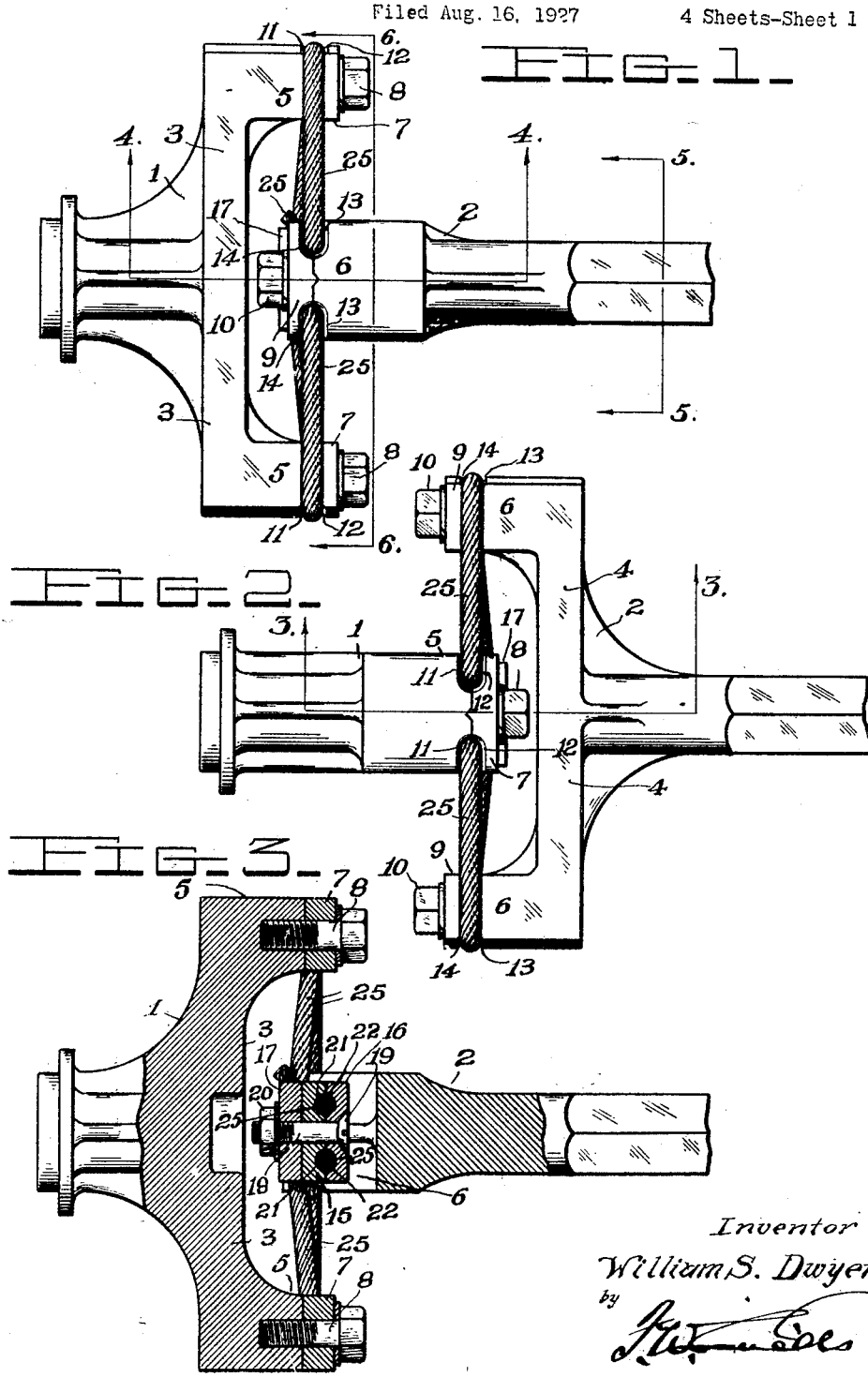
Inventor
William S. Dwyer
by
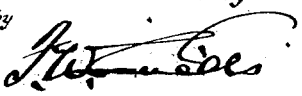
Attorney

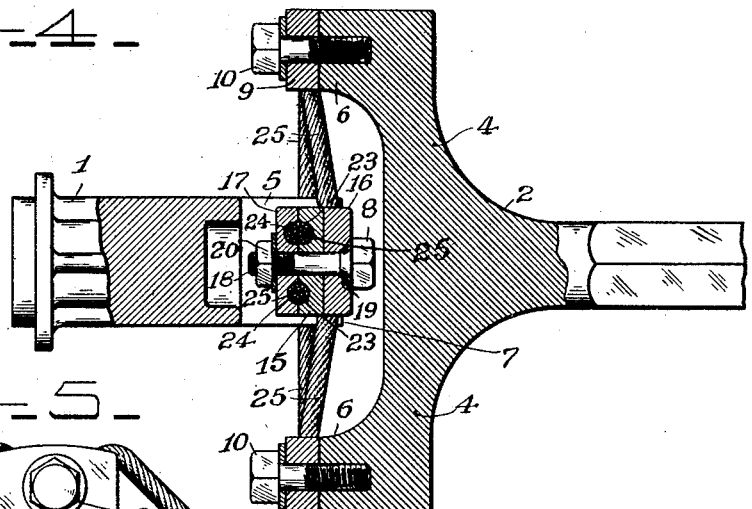
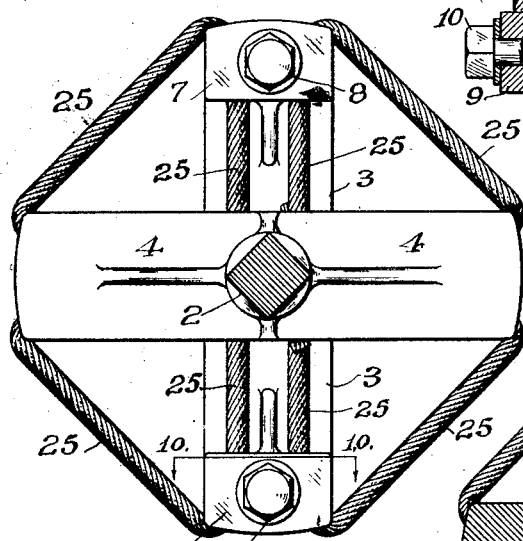
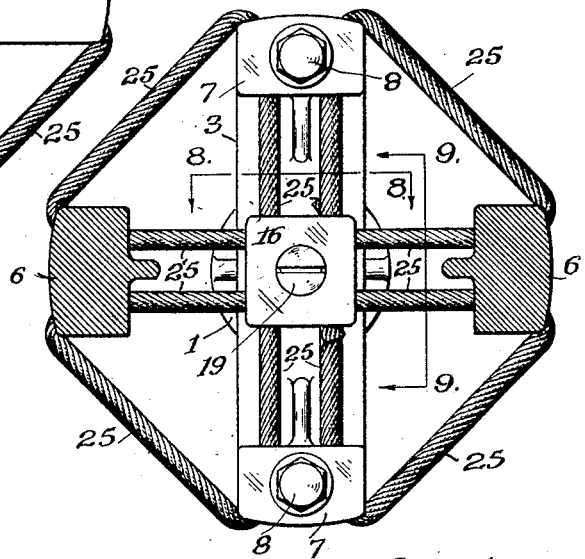

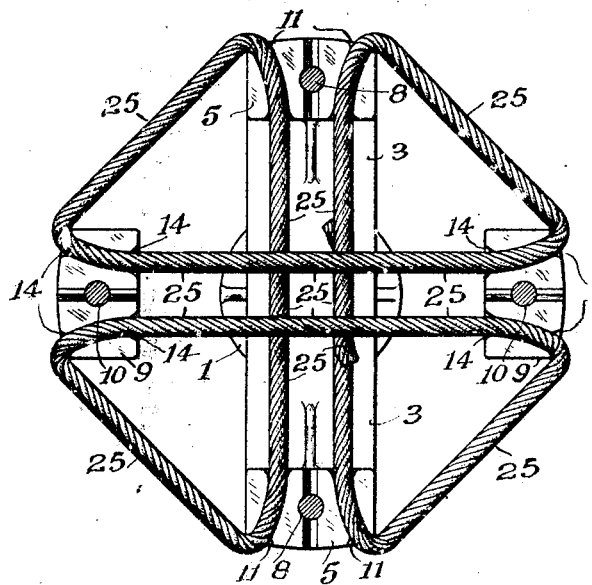
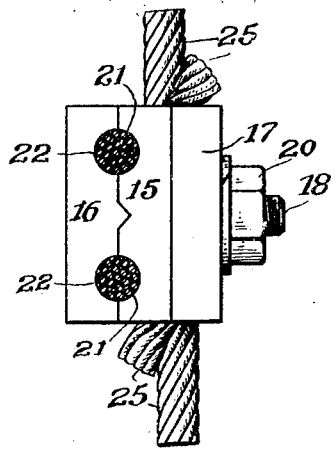
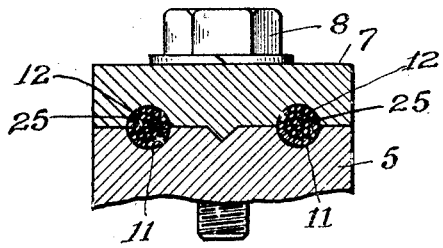

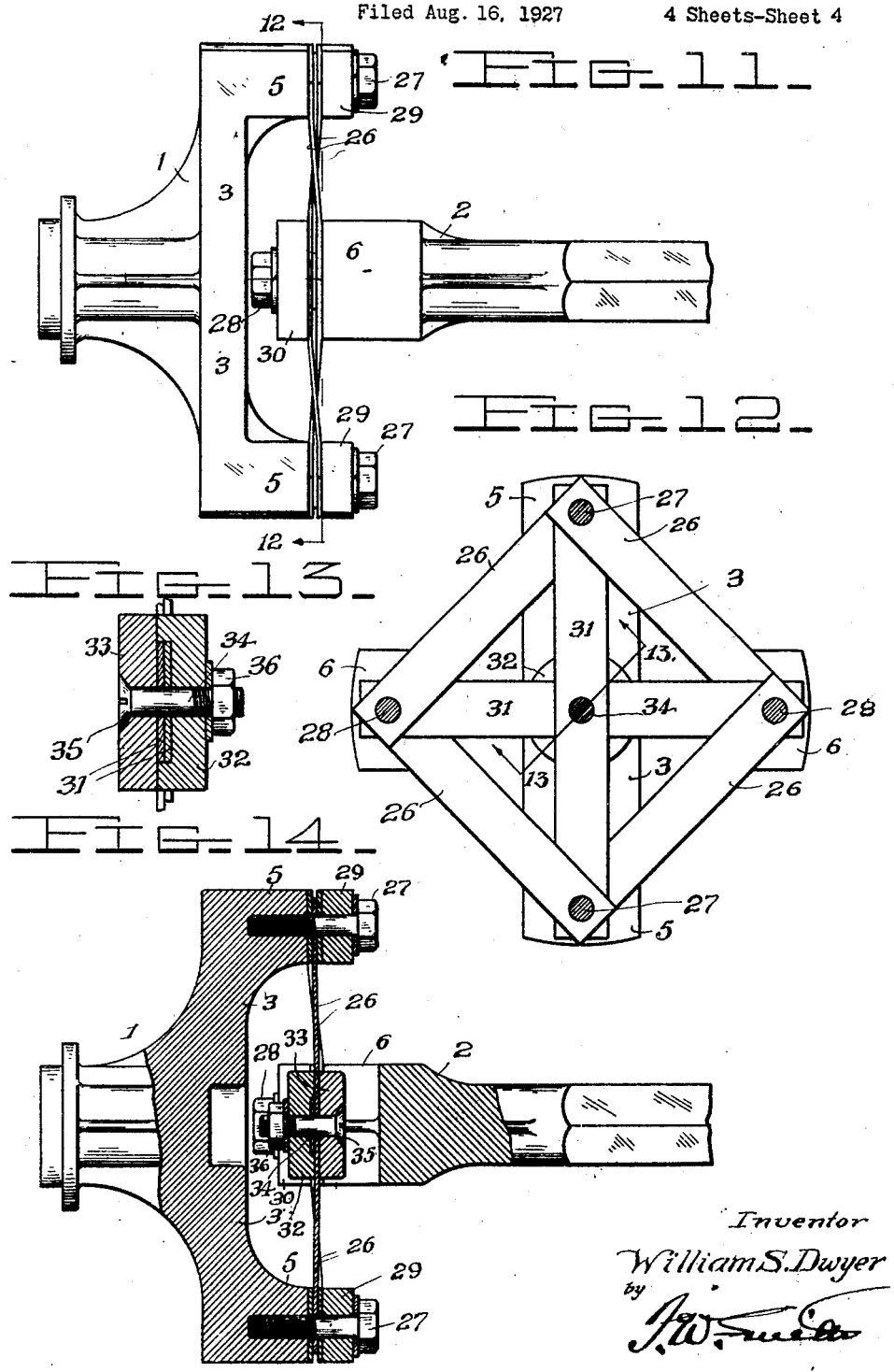

Patented Feb. 14, 1928.

1,659,353

UNITED STATES PATENT OFFICE.

WILLIAM S. DWYER, OF DEVON, CONNECTICUT.

FLEXIBLE COUPLING FOR ROTARY MEMBERS.

Application filed August 16, 1927. Serial No. 213,354.

This invention relates to flexible connections for rotary members, and has for its object to effect by the reeving of metal cables through blocks that are carried by the rotary elements, the equivalent of a ball and socket joint.

A further object of the invention is to provide a connection of this nature that will require no lubrication whatever.

Additional objects will be made manifest from the following detailed description which is to be read in connection with the accompanying drawings in which Figure 1 is a side elevation of a structure made in accordance with the present invention—

Figure 2 is a plan view of the construction shown at Figure 1—

Figure 3 is a section at the line 3—3 of Figure 2—

Figure 4 is a section at the line 4—4 of Figure 1—

Figure 5 is a section at the line 5—5 of Figure 1—

Figure 6 is a section at the line 6—6 of Figure 1—

Figure 7 is a view similar to Figure 6 but with the clamping blocks of one rotary element removed while the other rotary element has been removed so as to show its clamping blocks alone—

Figure 8 is a section at the line 8—8 of Figure 6—

Figure 9 is a section at the line 9—9 of Figure 6—

Figure 10 is a section at the line 10—10 of Figure 5—

Figure 11 is a view similar to Figure 1 but showing a modification of the invention—

Figure 12 is a section at the line 12—12 of Figure 11—

Figure 13 is a detail section at the line 13—13 of Figure 12, and

Figure 14 is a sectional elevation similar to Figure 3.

Similar numerals of reference denote like parts in the several figures of the drawing.

1, 2, are the rotary members, each of which carries at its inner end radially extending arms 3, 4, the arms of each member being diametrically opposed, and the arms of one member being disposed in a plane at right angles to the plane in which the arms of the other member are disposed.

The arms 3 of the member 1 terminate in inwardly projecting lugs 5, and the arms 4 terminate in inwardly projecting lugs 6, these lugs 5 and 6 extending toward each other and being substantially in the same cross plane. 7 are clamping blocks secured to the lugs 5 by screw bolts 8, and 9 are clamping blocks secured to the lugs 6 by screw bolts 10, the lugs 5 and blocks 7 being formed with pairs of complementary clamping grooves 11, 12, while the lugs 6 and blocks 9 are formed with similar pairs of clamping grooves 13, 14, these grooves being all of such shape that, when the clamping blocks are relaxed, said grooves will constitute openings through which a metal cable may be inserted in the manner and for the purpose presently to be described.

Centrally located between the lugs 5 and 6 and in substantially the same cross plane therewith, is a floating clamping block composed of a middle block 15 that is flanked by clamping blocks 16 and 17, these blocks being clamped together by a bolt 18 one end of which is headed as shown at 19, while on the other end is driven a nut 20.

The block 15 in one face has a pair of complementary clamping grooves 21 and the block 16 on that face has a similar pair of grooves 22, while the other face of the block 15 has a pair of complementary clamping grooves 23 that are disposed in a direction at right angles to that of the grooves 22, and the block 17 on this face is formed with a similar pair of grooves 24, and when the blocks 16, 17, are relaxed, all of these grooves will permit the insertion therethrough of a metal cable as will now be described.

25 is a metal cable which is inserted through the various grooves hereinbefore described, the ends of the cable being within one opening that is provided by one of the pair of grooves 23, 24, and for that reason these particular grooves are somewhat deeper than any of the other grooves, as will be readily seen by reference to Figures 4 and 8 without any special designation.

From an inspection of Figure 7 it will be clear that the cable is so reeved that it alternately connects the sides of the arms of one rotary member with the corresponding sides of the arms of the other rotary member, and that said cable is passed through the grooves in the central floating clamping member whenever such cable is led from the grooves at the side of an arm to the opposite grooves at the side of the same arm. Therefore it will be clear that the cable crosses itself at four points in the center, and this crossing is effected through the oppositely extending pairs of grooves formed by the block 15 and the clamping blocks 16, 17, as above described, and the ends of the cable are housed within the larger one of the pair of grooves 23, 24.

The cable is placed under great tension, and all the clamping blocks are forced to grip the cable firmly, and all the sections of the cable are therefore taut, so that there can be no undue swaying of the arms, while at the same time, rocking movements of the arms in all directions are permitted the same as in the ordinary ball and socket connection.

The central floating clamp block that is secured to sections of the cable that pass through said block in planes that intersect at right angles, serves as an efficient stabilizer, since it steadies the rotary movements of the arms and prevents undue swaying movements of the cable.

The manner in which the cable connects the parts is the preferred arrangement, since it will be apparent that the connecting of the opposed arms at their outer peripheries, as shown, is quite advantageous, in that motion is communicated from one pair of arms to the other pair at a maximum leverage, while any consequent strains are partially sustained by the stabilizer.

It is also preferred to use a single cable, although, since such cable is firmly clamped to all the arms as well as to the stabilizer, the same effect would be produced by using short sections of cable, and therefore the invention is not limited in this respect.

In Figures 11 to 14 inclusive, I have shown a modification of this invention in which the connections between the parts are made by means of separate steel strips, and while this construction is practicable, by reason of the fact that such strips are not only flexible but can be submitted to torsion, nevertheless the construction heretofore described is far preferable although the invention is not limited to any particular means for connecting the arms of the rotary members through the medium of the stabilizer block.

Referring to these Figures 11 to 14 inclusive, 26 are flexible steel strips which are respectively secured to the lugs 5 and 6 by bolts 27, 28, and clamp blocks 29, 30, and 31 are likewise steel strips that are secured at their extremities to said lugs 5 and 6, by the said bolts, and are crossed at their central portions and secured to an ordinary block 32 by means of a clamp 33 and a bolt 34 having a head 35 at one end and a nut 36 driven on the other end.

What is claimed is:—

1. A flexible connection for rotary members, comprising branch arms extending radially from said members, the arms of one member extending in a plane at right angles to the plane in which the arms of the other member extend, a floating clamp block between said members, flexible metallic means which alternately connects the arms of one member with the arms of the other member and with said block, and devices for clamping said means to said arms and block.

2. A flexible connection for rotary members, comprising branch arms extending radially in opposite directions from each of said members and terminating in inwardly extending lugs, the arms of one member extending in a plane at right angles to the plane in which the arms of the other member extend, a floating clamp block between said members, flexible metal connections between said lugs and block, and means for clamping said connections to said lug and block.

3. A flexible connection for rotary members, comprising branch arms extending from said members and disposed in planes that are at right angles to each other, said arms at their extremities being in substantially the same plane, a stabilizer clamp block centrally disposed with respect to the extremities of said arms and in substantially the same plane therewith, a flexible metallic means for connecting the extremities of the arms of one member with the extremities of the arms of the other member through the medium of said stabilizer, and individual clamps for securing said means to all of said arms and to said stabilizer.

4. A construction as in claim 1, in which the flexible metallic means is a metal cable which has parallel portions that extend between the ends of the arms of each rotary member, which portions lead through the floating clamp block.

In testimony whereof I affix my signature hereto.

WILLIAM S. DWYER.